United States Patent [19]
Taylor

[11] 3,871,616
[45] Mar. 18, 1975

[54] GATE VALVE DISC

[76] Inventor: Julian S. Taylor, 8300 S.W. 8, Oklahoma City, Okla. 73108

[22] Filed: Dec. 10, 1973

[21] Appl. No.: 423,596

[52] U.S. Cl.................. 251/175, 251/327, 251/328, 251/368, 251/84
[51] Int. Cl............................................ F16k 3/02
[58] Field of Search .......... 251/327, 328, 175, 368, 251/84

[56] References Cited
UNITED STATES PATENTS

| | | | |
|---|---|---|---|
| 2,750,962 | 6/1956 | Kreitchman et al. ........... | 251/175 X |
| 3,614,061 | 10/1971 | Fitzpatrick...................... | 251/328 X |
| 3,768,774 | 10/1973 | Baugh............................... | 251/175 |

*Primary Examiner*—Arnold Rosenthal
*Attorney, Agent, or Firm*—Robert K. Rhea

[57] ABSTRACT

A gate valve having a flow passage therethrough is provided with a valve stem movable disc having an opening permitting fluid flow through the passageway when in register therewith and interrupting fluid flow when the disc is in a valve closed position. The disc is provided with a removable cylindrical plug mating with ring-like seats on opposite sides of the disc surrounding and coaxial with the flow passageway.

3 Claims, 9 Drawing Figures

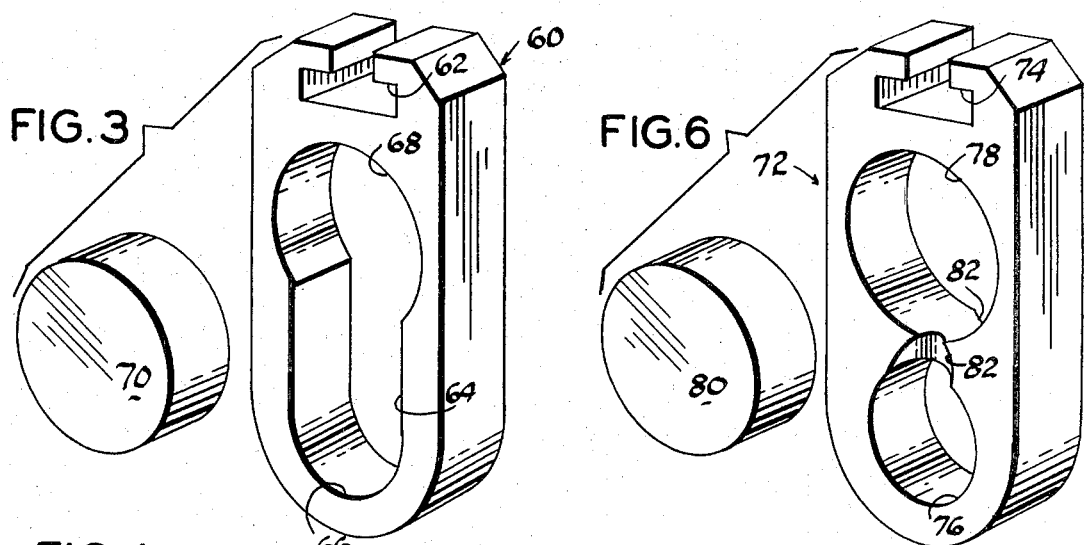
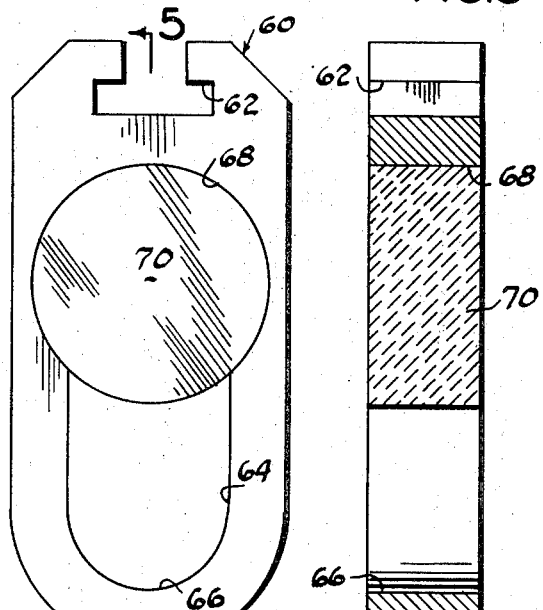
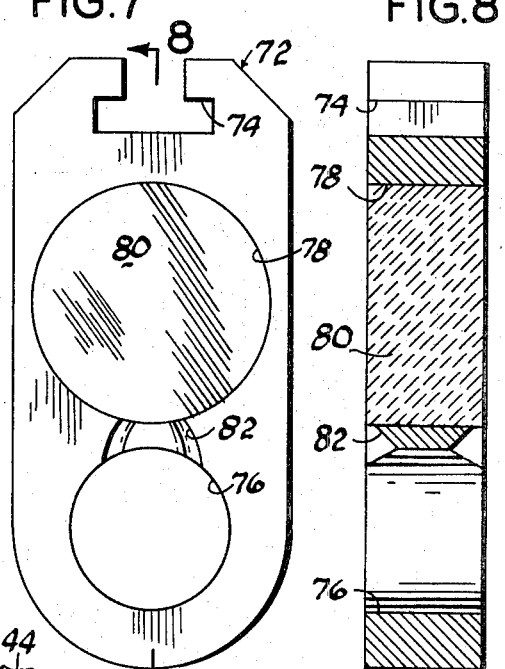
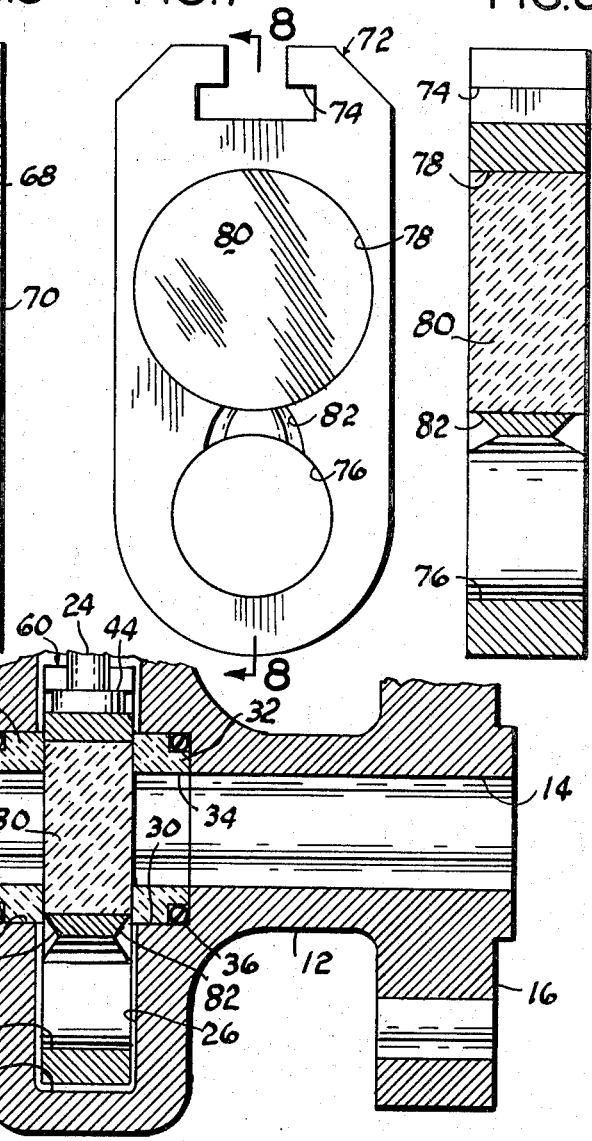

GATE VALVE DISC

BACKGROUND OF THE INVENTION

1. Field of the Invention

The present invention relates to gate valves and more particularly to a gate valve having a fluid passageway closing disc therein with an opening through the disc permitting fluid passage through the gate valve.

2. Description of the Prior Art

Gate valves presently in use for controlling the flow of high pressure fluids containing abrasive materials, such as sand, or the like, are usually provided with ring-like seats or sealing members surrounding the flow passageway on opposite sides of a disc slot normal to the axis of the flow passage which slidably receives a generally U-shaped disc having an aperture therein movable into and out of registration with the flow passageway for permitting and interrupting flow therethrough. The disc is usually formed from ceramic material intended to sealingly mate with like material disc seals or seats with the disc being movable by a manually operated wheel or control axially moving a valve stem contained by the bonnet of the gate. The discs presently in use include a stem connector or head portion connecting the disc to the valve stem with a ceramic portion of the disc secured to the stem connector by a U-shaped band surrounding the curved end and the legs of the generally U-shaped ceramic portion of the disc.

The principle objection to this type of gate valve disc is that the single piece ceramic disc portion being confined by the band and disc guide slot does not readily sealingly mate with the ceramic seating rings when the disc is in flow passageway closed position which is due in some instances to one or the other of the ceramic seating rings being slightly tilted with respect to axial alignment with the flow passageway. Further, the single piece ceramic portion of the disc is subject to frequent breakage, as a result of a workman spinning the gate valve wheel and moving the disc to a closed position, wherein the disc, at its depending end strikes the depending limit of the disc guide slot in a hammering action, resulting in cracking the ceramic portion and a subsequent failure of the disc in sealing the passageway when the gate valve is in closed position. Also the U-shaped band holding the ceramic portion is, because of space limitations, very thin and if the gate remains in a closed position for any extended period of time the force required to open the gate may exceed the tensile strength of the bond securing the U-shaped band around the ceramic portion.

The gate valve disc of this invention overcomes the above objections by forming the disc of metallic material with an opening in its depending end for axial registration with the flow passageway and forming a second opening or aperture intermediate its ends which freely receives a cylindrical plug of ceramic or other hard material having a diameter less than the ceramic disc seat rings wherein the axis of the plug may tilt at an acute angle with respect to the axis of the flow passageway and sealingly mate with one or the other of the ceramic seating rings. Further, since the disc, except for the plug, is constructed of metallic material, breakage of the disc is eliminated by any valve closing action of the disc.

SUMMARY OF THE INVENTION

A gate valve having a body with a flow passageway therethrough is provided with a disc guide slot transversely intersecting the flow passageway for slidably receiving a disc. The body supports a seating ring coaxial with the flow passageway at the upstream and downstream sides of the disc receiving slot. A disc, formed of metallic material, is attached to the gate valve stem and is slidably positioned within the body slot. The disc is transversely apertured providing an opening movable into and out of axial registration with the flow passageway by movement of the disc and a cylindrical plug member is removably supported by an aperture in the disc for sealingly mating with the adjacent surface of one of the seating rings when the disc is in flow passageway closed position.

The principle object of this invention is to provide a disc for a gate valve for controlling fluid flow of high pressure abrasive material by providing a disc having a plug formed of abrasive resistant material which is slidingly separated by the disc in a manner not easily damaged by rough treatment for sealingly mating with gate valve seats surrounding the flow passageway on opposite sides of the disc when the latter is in flow passageway closed position and that will allow for plug closure with a seat whose axis is not in exact coaxial alignment with the flow passageway.

BRIEF DESCRIPTION OF THE DRAWINGS

FIG. 3 is an exploded perspective view of the preferred embodiment of the gate valve disc;

FIG. 4 is an elevational view of FIG. 3 in assembled form;

FIG. 5 is a vertical cross-sectional view taken substantially along the line 5—5 of FIG. 4;

FIG. 6 is an exploded perspective view of another embodiment of the gate valve disc;

FIG. 7 is an elevational view of the disc of FIG. 7 when assembled;

FIG. 8 is a vertical cross-sectional view taken substantially along the line 8—8 of FIG. 7; and, FIG. 9 is a fragmentary vertical cross-sectional view illustrating the other embodiment of the disc within the gate valve when in passageway closed position.

DESCRIPTION OF THE PREFERRED EMBODIMENTS

Figure 2:
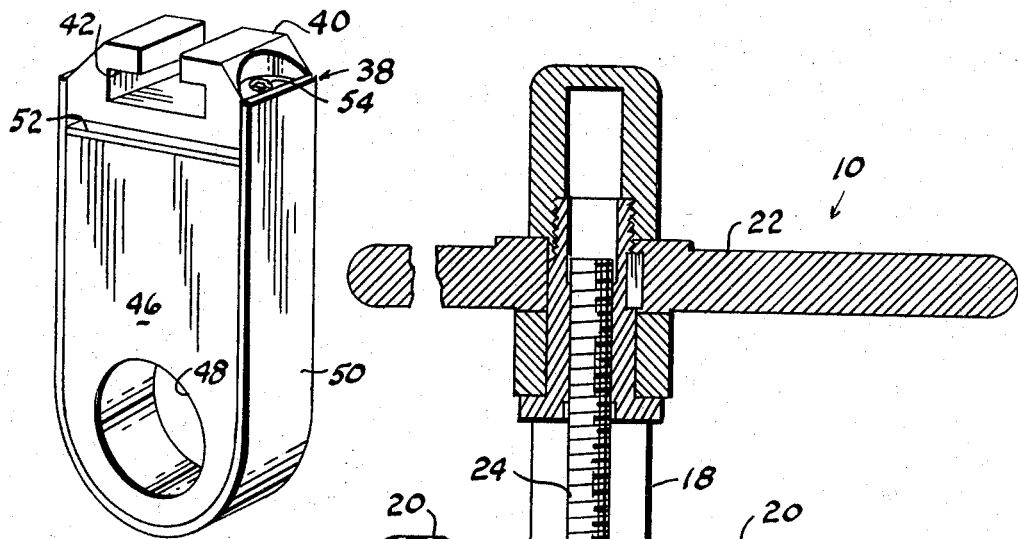
FIG. 2 is a perspective view of a conventional ceramic disc normally used in the type of gate valve shown in FIG. 1.

Like characters of reference designate like parts in those figures of the drawings in which they occur.

In the drawings:

The reference numeral 10 indicates the gate valve, as a whole, comprising a body 12 having a flow passageway 14 therethrough and flanged ends 16 for connecting the gate valve to adjacent ends of a conductor, such as a pipe, not shown. The gate valve is provided with a bonnet 18 secured in a conventional manner by bolts 20 to the valve body. The bonnet is provided with a hand control or gate wheel 22 threadedly engaging a valve stem 24 for axially raising and lowering the latter with respect to the body 12. The body is provided with a transverse elongated U-shaped chamber or slot 26 open to the bonnet and extending beyond the lateral limits of the flow passageway and beyond the flow passageway opposite the bonnet a distance at least greater than the diameter of the flow passageway into which the stem 24 projects and which slidably receives guidingly the gate valve disc 60.

The body 12 is counterbored, as at 30, coaxial with the passageway 14 on opposite or upstream and downstream sides of the slot 26, for receiving a pair of ring seals or seats 32, formed from ceramic or other material having a hardness of forty or above as measured on the Rockwell C scale, each having a bore 34 diametrically approximately equal with respect to the flow passageway 14 and forming an intermediate portion thereof. The seats 32 are sealed within the respective counterbore by O-ring seals 36.

The numeral 38 indicates a conventional gate valve disc of general U-shape having a length substantially less than the length of the guide slot 26 between the bonnet 18 and the surface 39 forming the depending limit of the slot comprising a stem connector or head portion 40 having an inverted T-shaped groove 42 which nests the cylindrical head 44 formed on the depending end of the valve stem 24. The disc 38 further includes a U-shaped ceramic body member 46 dimensioned to be received by the disc guide slot 26 and having an aperture 48 in its depending end diametrically equal with respect to the flow passageway 14 when moved into registration therewith. The disc body 46 is secured to the valve stem connector 40 by a substantially U-shaped metallic band 50 surrounding the bottom end and opposing side edges thereof and secured by the end edge portions of the band to the connector 40, as by welding, not shown. The length of the disc body 46 is slightly less than the spacing between the disc connector 40 and bight portion of the U-shaped band 50 and a metallic plate 52 is interposed between the end of the disc body 46 and the connector 40. Set screws 54, only one being shown, threadedly supported by the connector 40, impinge the plate 52 against the disc body 46 for gripping or wedging the disc body within the U-shaped band 50. Thus it may be seen that when the hand wheel 22 is spun or rotated rapidly for closing the flow passageway 14 the valve stem 24 drives the gate valve disc 38 downwardly, as viewed in the drawings, so that the bight portion of the U-shaped band 50 is forced against the bottom 39 or depending limit of the disc guide slot 26 so that the opposite force of the valve body, as a result of the spinning gate wheel 22, moving the valve stem 24 and disc 38, is transferred to the ceramic disc body portion 46 and results in breakage thereof.

As mentioned hereinabove, a gate valve which has remained closed for an extended period of time is sometimes difficult to open. This may be caused by sediment, in fluid contained by the upstream side of the gate valve, settling around the sealing ring and gate disc as well as corrosion acting on mating threads of the stem and gate wheel in addition to fluid pressure against the gate disc. Under such conditions an attempt to force the gate to an open position, by rotation of the gate wheel 22, may result in rupturing the weld connecting the ends of the U-shaped band 50 to the valve stem connector 40 and the necessity of removing and replacing the entire gate valve.

The above description is substantially conventional with this type of gate valve and it is with such a gate valve that the gate valve disc of this invention is intended to be used. The reference numeral 60 indicates a gate valve disc of general U-shape dimensioned for vertical reciprocation in the valve guide slot 26 having an inverted T-shaped slot 62 in its upwardly disposed head end portion for receiving the valve stem head 44. The depending end portion of the disc 60 is provided with a transverse U-shaped opening 64 with the bight portion 66 of the U-shape being formed on a radius complemental with the flow passageway 34. The upper end portion of the disc 60 is provided with an aperture 68 intersecting the upper limit of the U-shaped opening 64 and formed on a radius slightly smaller than the outside radius of the seat forming rings 32. A right circular cylindrical plug 70, having a length equal to the thickness of the disc 60, is loosely received coaxially by the aperture 68.

Referring more particularly to FIGS. 6, 7 and 8, the reference numeral 72 indicates another embodiment of the disc substantially equal in overall dimensions with respect to the disc 60 and having an inverted T-shaped slot 74 for engagement with the valve stem head 44. The disc 72 is provided with a transverse circular opening 76 adjacent its depending end diametrically equal with respect to the flow passageway 34. A circular aperture 78 is transversely formed through the disc 72 between the opening 76 and inverted T-shaped slot 74 diametrically slightly smaller than the outside radius of the seat rings 32 which similarly receives a circular plug 80. Opposing side surfaces of the disc 72, between the opening 76 and aperture 78, are cut away to form arcuate recesses 82 for the purposes presently explained.

The plugs 70 and 80 are formed from ceramic or other material having a hardness of forty or above as measured on the Rockwell C scale.

OPERATION

Figure 1:
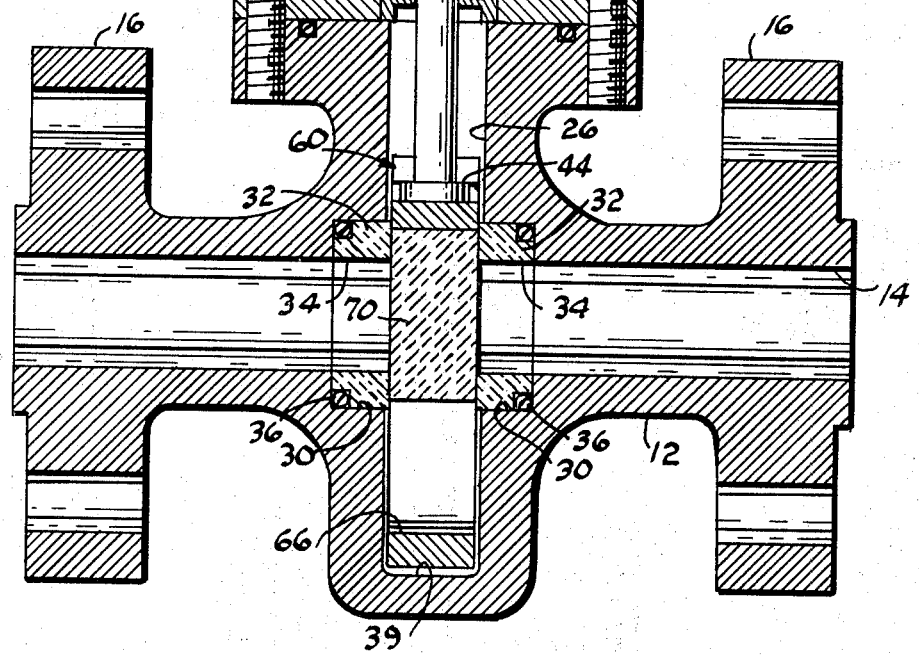
FIG. 1 is a fragmentary vertical cross-sectional view of a flanged end single disc rising stem gate valve illustrating the preferred embodiment of this invention installed therein in fluid passageway closed position.

In operation the disc 60 connected with the valve stem 24, is installed in the valve, as described hereinabove. The opposing upstream and downstream marginal edge portions of the disc 60 remain in contact with peripheral portions of the seat rings 32 and maintain them in substantially coaxial alignment. A portion of the plug 70 is interposed between the seat rings 32 at all times. With the disc in closed position, as illustrated in FIG. 1, the valve stem has moved the disc downwardly so that the cylindrical plug 70 is coaxially aligned with the passageway 34. In this position the plug 70, by a fluid pressure impinging thereagainst, matingly seals with the downstream stationary seating ring 32 wherein, if the seating ring is slightly tilted with respect to the axis of the flow passageway, the plug 70 is free, by being loosely contained by the aperture 68, to tilt its axis to the identical tilting angle of the seat ring and form a seal therewith. When the gate valve is to be opened by rotation of the wheel 22, the valve stem 24 lifts the disc 60 so that, as the depending limit of the plug 70 approaches the depending limit of the passageway 34, fluid may enter the U-shaped opening 64 thus reducing pressure against the member 70 and allowing the disc 60 to be lifted by the valve stem until the U-shaped opening forms an unrestricted passageway through the disc. Rapid closing of the valve, as by spinning the control wheel 22 so that the depending limit of the disc 60 is abruptly stopped by the bottom end 39 of the disc guide slot, results in the force being applied to the metallic portion of the disc 60 with no damage to the plug 70 when formed from ceramic material.

Operation of the alternative embodiment of the disc 72, is substantially equal to that described for the disc 60, with the exception that when the disc 72 is being lifted by the valve stem to open the flow passageway 34, pressure from the upstream side of the disc is initially released through the recesses 82 flowing through the opening 76 when the depending portion of the plug 80 is moved upwardly beyond the depending limit of the flow passageway 34.

Obviously the invention is susceptible to changes or alterations without defeating its practicability, therefore, I do not wish to be confined to the preferred embodiment shown in the drawings and described herein.

I claim:

1. In a gate valve having a body provided with a flow passageway and having a disc receiving guide slot transversely intersecting the passageway, a valve stem having one end portion axially movable within the disc slot toward and away from the axis of the passageway and having a pair of disc seat rings formed from material having a Rockwell scale C hardness of at least forty disposed, respectively, on the upstream and downstream sides of the disc slot coaxial with respect to the passageway and defining confronting seat ring surfaces respectively disposed in the planes forming the upstream and downstream sides of the slot, the improvement comprising:

a metallic disc slidable within the disc slot,
said disc having a head portion removably secured to said one end portion of said valve stem for moving said disc and opening and closing the passageway,
said disc having a transverse U-shaped opening, at least equal in area to the transverse cross-sectional area of the passageway, in its end portion opposite said disc head portion and having a transverse aperture communicating with the U-shaped opening and coaxial with the passageway when said disc is in valve closed position and being at least diametrically equal to the diameter of the passageway; and,
a plug formed of material having a Rockwell scale C hardness of at least forty freely received by the disc aperture and slidably interposed between said disc seat rings for coaxially registering and sealing with said disc seat ring on the downstream side of the disc slot and closing the passageway when said disc is moved to a valve closed position.

2. The gate valve according to claim 1 in which the tolerance between the diameter of said plug and the disc aperture permits the axis of said plug to be tilted on an acute angle, by fluid pressure thereagainst, with respect to the axis of the passageway when sealingly contacting said downstream seat ring.

3. In a gate valve having a body provided with a flow passageway and having a disc receiving guide slot transversely intersecting the passageway, a valve stem having one end portion axially movable within the disc slot toward and away from the axis of the passageway and having a pair of disc seat rings formed from material having a Rockwell scale C hardness of at least forty disposed, respectively, on the upstream and downstream sides of the disc slot coaxial with respect to the passageway and defining confronting seat ring surfaces respectively disposed in the planes forming the upstream and downstream sides of the slot, the improvement comprising:

a metallic disc slidable within the slot,
said disc having a head portion removably secured to said one end portion of said valve stem for moving said disc and opening and closing the passageway,
said disc having a transverse opening, having its axis parallel with the axis of the passageway and at least equal in area to the transverse cross-sectional area of the passageway, in its end portion opposite said disc head portion and having a transverse aperture coaxial with the passageway when said disc is in valve closed position and being at least diametrically equal to the diameter of the passageway,
said disc having a recess in its upstream and downstream surface providing communication between the aperture and the opening; and,
a plug formed of material having a Rockwell scale C hardness of at least forty freely received by the disc aperture and slidably interposed between said disc seat rings for coaxially registering and sealing with said disc seat ring on the downstream side of the disc slot and closing the passageway when said disc is moved to a valve closed position.

* * * * *